United States Patent Office 3,156,110
Patented Nov. 10, 1964

3,156,110
ULTRASONIC DETECTION AND VISUALIZATION
OF INTERNAL STRUCTURE
Manfred E. Clynes, Orangeburg, N.Y.
(Sneeden's Landing, Palisades, N.Y.)
Filed July 23, 1962, Ser. No. 211,730
10 Claims. (Cl. 73—67.8)

This invention relates generally to ultrasonic techniques for exploring internal structure, and more particularly to the ultrasonic detection of the internal structure of living organisms and the visualization thereof in terms of color.

Ultrasonic testing devices are widely used for locating flaws in solid pieces. Such inspectoscopes are adapted to transmit ultrasonic waves into the piece and to determine the presence of flaws therein by reflection or by an interception of the wave transmission through the piece. These devices are not only effective in sensing the presence of discontinuities or defects in solid bodies such as metal and glass objects, but they have also been applied to soft objects such as automobile tires.

In recent years attempts have been made to employ similar ultrasonic techniques in exploring the internal structure of living organisms. One important advantage of ultrasonics is that it is non-destructive and free of the hazards incident to the use of X-ray or Gamma ray examination.

It is known to use pulse-echo ultrasonic methods in combination with standard scanning procedures to produce patterns on a cathode ray viewing screen representative of the internal structure being scanned. Such representations with existing techniques are essentially black and white or monochrome images. Thus, structural characteristics are displayed in the gray scale and must be analyzed accordingly. This seriously limits the diagnostic value of the ultrasonic technique.

If, for example, an ultrasonic examination is to be made of a tumor, differentiation can be made between tumors which grow in a diffused manner and those enclosed in a smooth sheath. With existing scanning techniques, this difference would at best be revealed as a slight difference in the gray scale, and the diagnosis would be uncertain.

Accordingly, it is the main object of this invention to provide an ultrasonic technique for the detection and visualization of internal structure, whereby color patterns or images are produced, indicative of the irradiated medium.

A significant feature of this invention is that the shades or variations of color which are presented are related to differences in structural characteristics, thereby facilitating diagnosis. Thus tumors growing in a diffused manner will be revealed in colors distinct from those enclosed in a smooth sheath, and various differences in growth structure can be readily recognized. Thus cancerous tumors might be detected in colors distinct from those produced by benign tumors.

More specifically, it is an object of this invention to provide an ultrasonic technique wherein a given medium is scanned or explored by three ultrasonic beams, each having a different frequency, to produce three signals which are modulated as a function of the characteristics of the medium with respect to the beam frequency. The signals are applied as intensity modulation components to a color television tube to effect a visual presentation in color. Since various structures of the body, and in particular variations in the soft tissues, have different absorption and reflection properties with reference to different ultrasonic frequencies, a differential visualization can be obtained wherein shades of color rather than shades of gray, are correlated to differences in structural characteristics.

Also an object of the invention is to provide a diagnostic instrument constituted by a tri-frequency ultrasonic scanning system coordinated with a tri-color television indicator to produce images of internal structure, the instrument being useable without the slightest danger to the patient.

One of the important advantages of the invention is that it allows an arbitrary choice to be made of the three ultrasonic frequencies. This choice makes it possible to obtain different color effects from the same internal structure and thus in effect constitutes an electronic staining technique.

For a better understanding of the invention, as well as other objects and further features thereof, reference is made to the following detailed description to be read in conjunction with the accompanying drawing, wherein.

The production of color images can be effected either through transmittance and absorption of ultrasonic energy or by transmittance and reflection, the latter technique being known also as the pulse echo technique. While the invention will be described herein in connection with the pulse echo technique, it will be understood that the principles thereof are also applicable to transmittance and absorption examination methods.

Figure 1:
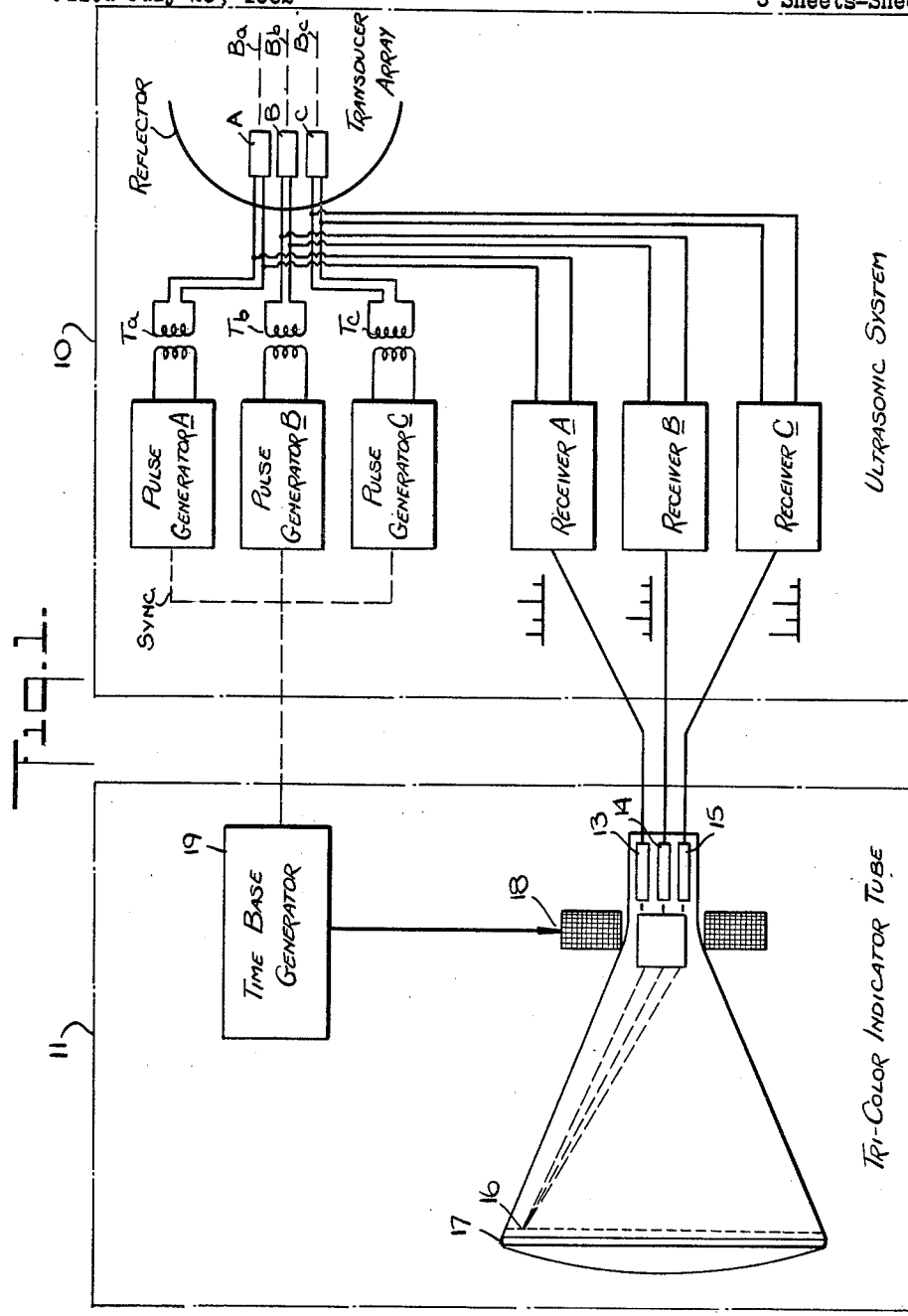
FIG. 1 is a schematic diagram of a simplified diagnostic system in accordance with the invention.

Referring now to FIG. 1, the basic assembly in accordance with the invention comprises a tri-frequency ultasonic pulse echo system, generally designated by the numeral 10, and a color indicator 11. The pulse echo system includes three ultrasonic transducers A, B and C, which may take the form of barium titanate. This material behaves as an electrostrictive piezoelectric transducer adapted to convert radio-frequency energy into ultrasonic waves, or to convert ultrasonic waves into radio-frequency energy. Thus the transducers are capable of acting as ultrasonic transmitting or detecting elements.

Since the pulse echo technique is being used, the transducers A, B, and C are simultaneously excited by means of three pulse generators A, B, and C, respectively, each operating at a different carrier frequency, such as 1, 2 and 4 megacycles, or 2, 5 and 10 megacycles, to produce three exploratory beams $Ba$, $Bb$, $Bc$. The generators are coupled to the transducers through coupling transformers $Ta$, $Tb$ and $Tc$. Echo pulses detected by the transducers are applied directly to receivers A, B, C, respectively, each of which is tuned to the pulse frequency of the associated transducer to produce demodulated output voltage pulses whose magnitudes are proportional to the amplitude of the pulses.

The pulse generators operate at a repetition rate of, say, about 500 to 1000 pulses per second, each pulse being of microsecond duration, whereby a relatively long interval for echo pulse reception exists between successive pulses. In practice, the duration of each pulse may be in the order of 10 microseconds or even shorter, and should be made up of as few cycles of the carrier frequency as possible.

It is desirable to reduce the ringing of the transmitter and receiver as far as possible in order to eliminate interference of the transmit signal and the echo signal with each other, and of the echo signals from various structures with each other. This can be accomplished by providing an equal and opposite pulse to the transducer after, say, two cycles of the original pulse, which will serve to cancel the subsequent ringing of the transducer.

In place of three transducers, three beams of different frequency may be produced with a single transducer sequentially pulsed by harmonically related frequencies, such as 1, 2, and 4 megacycles on the same transducer.

Figure 4:
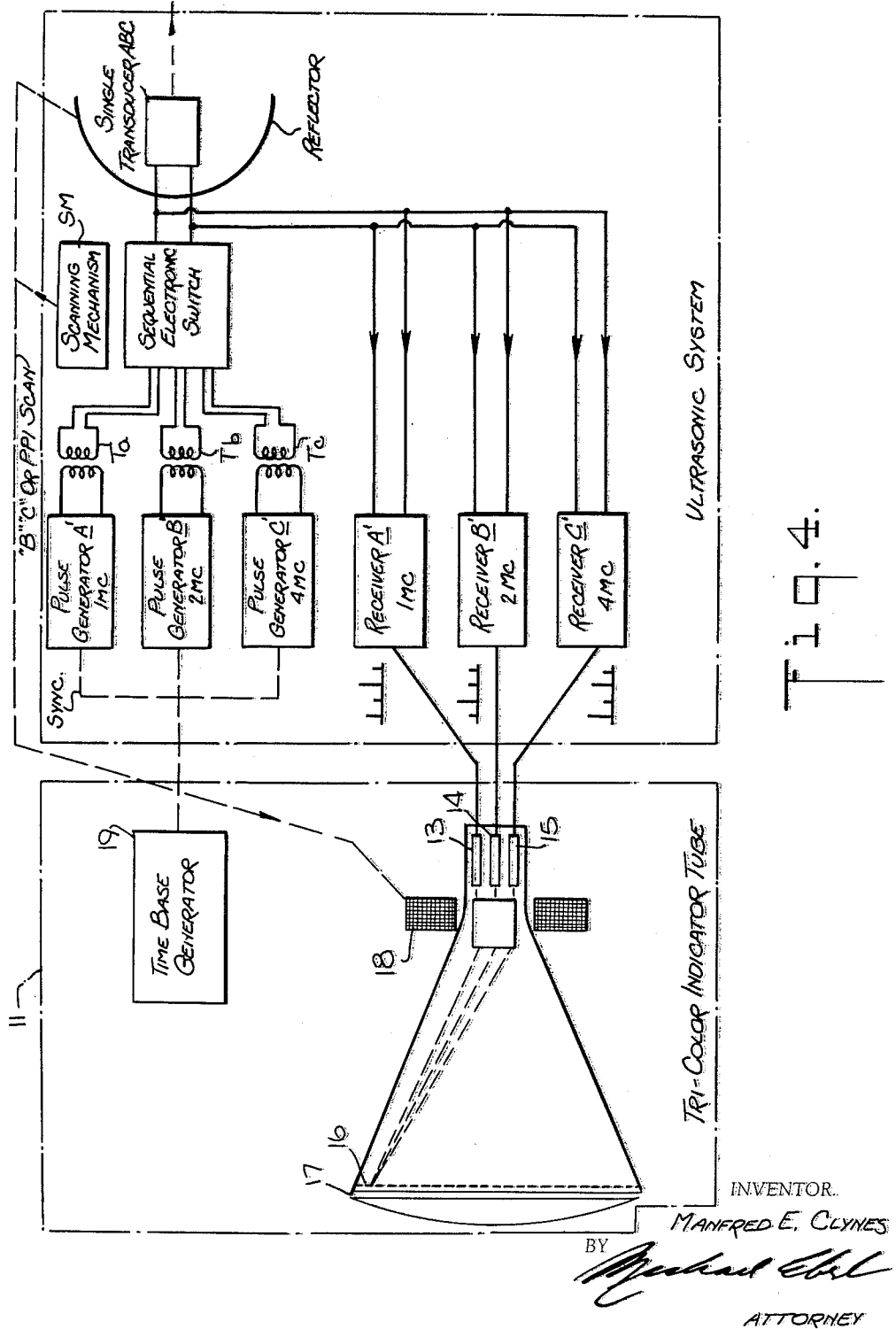
FIG. 4 is a schematic diagram of another embodiment of an ultrasonic diagnostic system in accordance with the invention.

This is accomplished, as shown in FIG. 4, by the use of a single transducer ABC which is sequentially excited through an electronically operated switch SS of any conventional design, by pulse generators A', B', C', each of which has a carrier frequency harmonically related to that of the other generators, as for example 1, 2 and 4 megacycles. The receivers A', B', and C' are coupled to the common transducer ABC, but are respectively tuned to the different carrier frequencies. Otherwise, the system and its operation are identical to that shown in FIG. 1.

Assuming that the three transducers A, B and C or the single transducer ABC are beamed or focused to irradiate the same region of internal structure, the presence of reflecting bodies within the region in the path of the beam results in echo pulses which will be picked up by the same transducers, the echo pulses returning at different points in time depending on their relative distance from the transducers, as in the case of sonar systems. Thus the time of arrival of the echo pulse gives an indication of the spatial position of the echo-producing target. The amplitude of the echo pulses will depend on the characteristic of the reflecting structure with respect to the pulse frequency. For example, a bone will ordinarily produce a high degree of reflectivity, but its reflection pulse will nevertheless be different for each pulse frequency. Similar differences will occur for other internal elements of the human body, depending in a sense on their acoustic properties, very much as objects in an auditorium have different absorption or reflection qualities with respect to sound tones.

Using again the example of differntiating tumors, when a tumor is irradiated by the three beams, the outputs of receivers A, B and C will be constituted by voltage pulses whose relative magnitudes will be different for different types of tumor and thus serve as a method of discriminating between benign and malignant characteristics, especially since malignant tumors frequently are not encapsulated in a smooth capsule, as in the case of benign tumors.

The outputs of the three receivers are applied to the intensity-modulation electrodes of a three-gun color TV tube or tricolor kinescope, such as a shadow mask color picture tube 12 now generally used in color TV receivers. These tubes produce color images through proper mixture of the red, green and blue primary colors.

Three electron guns 13, 14 and 15 are employed, one for each primary color. The electron streams from the guns converge at a perforated masking plate 16, and after passing through a perforation, the beams diverge and impinge upon three separate phosphor dots which when so excited, produce the red, blue and green light corresponding to the individual exciting beams. One set of tricolor dots is located in a triangular configuration behind each perforation on a screen 17, there being over 350,000 such perforations in the masking plate.

The three electron beams are individually focused and by an electrostatic lens system are made to converge at the apertured mask. The beams are electromagnetically deflected in the horizontal and vertical planes by a common yoke 18. While electromagnet deflection has been disclosed, it is to be understood that electrostatic means may be used for the same purpose.

The shadow mask holes and the screen dots are so positioned that the electron beam from the green gun can strike only green-emitting dots, and the red and blue beams can strike only red and blue emitting dots. The intensity of the light from the individual dots is controlled by the beam intensities, which are in turn controlled by the individual gun grids. The eye automatically integrates the colors and their intensities so that the color seen will be the additive resultant of the three primaries.

When, therefore, the intensity grids of the three cathode-ray guns are connected to the outputs of receivers A, B and C, the resultant image color will depend on the relative magnitudes of the applied signals, which in turn depend on the characteristic of the structure being irradiated.

To illustrate the operation of the system in the simplest possible manner, we shall assume that the three transducers produce beams which are directed to the cardiac region of a patient and so trained that lying in the beam path is the mitral valve guarding the opening between the left auricle and the left ventricle and preventing the return of blood to the auricle. Thus this valve element is in movement, and we shall assume in this example that all other reflecting targets in the path of the beam are static. Of course, in practice the other targets, such as the wall of the heart, may also be in motion.

To display the various echo pulses in the path of the three beams along a common base line, we shall make use of a time base saw-tooth wave generator 19 coupled to the deflection yoke 18 to deflect the three-color beam along a horizontal line. The time base generator is synchronized with pulse generators A, B and C so that scanning commences simultaneously with the transmission of the three ultrasonic pulses.

Figure 2:
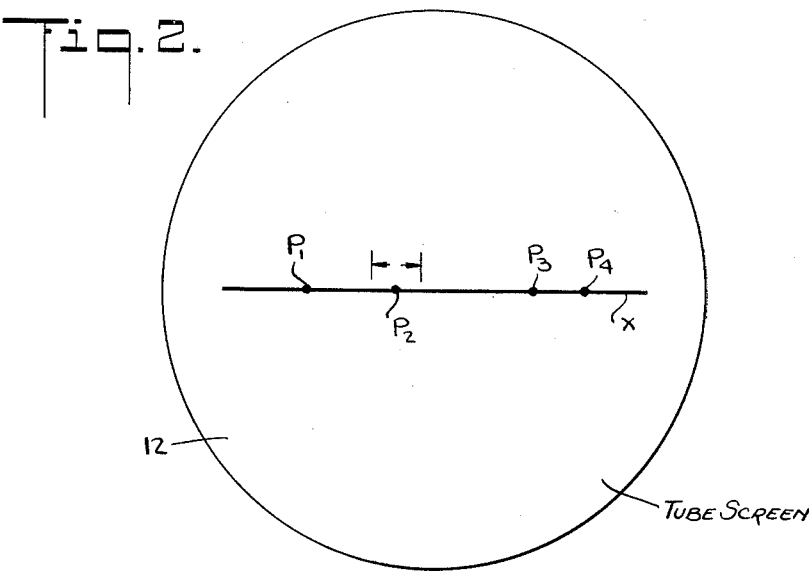
FIG. 2 shows the screen presentation of the system.
Figure 3:
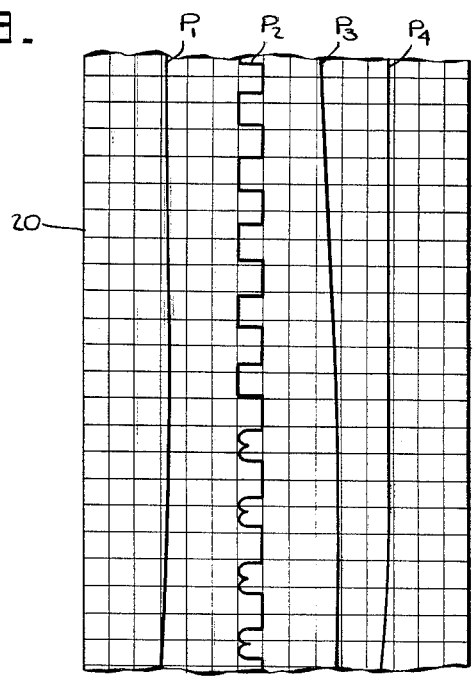
FIG. 3 shows a moving chart recording of the screen presentation.

As the convergent electron beams are horizontally deflected, their intensities are modulated by the output of receivers A, B and C. Thus, as shown in FIG. 2, along the base line X, a series of dots $P_1$, $P_2$, $P_3$ and $P_4$ is developed, each representing a particular echo. Each dot has a distinctive color depending on the nature of the reflecting object producing the echo. The space between dots represents the relative displacement between the reflecting objects in the irradiated path.

We shall assume that dot $P_2$ represents the mitral valve, and since this valve is moving, the dot will shift back and forth along the base line X.

If, therefore, we color-photograph the screen presentation by means of a moving chart recorder which shifts at a constant speed relative to the cathode ray screen, and making use of color film 20, each dot will appear as a continuous trace. In the case of trace $P_2$, since this represents the valve and shifts back and forth on the base line, a wave pattern will be produced which is indicative of opening and closing of the valve. Where the wave formation is double humped, as indicated in the lower portion of the wave, this would indicate a proper valve functioning, whereas if the wave formation is somewhat rectangular, this would indicate a defective valve action.

The slope of the lefthand part of the rectangular trace represents the rate of closing of the valve. A defective valve stays open longer if the defect consists of an abnormally small valve opening. Thus a small angle of slope and the absence of hump indicates inadequate opening orifice of the valve.

Each trace will have a distinctive color, and it thereby becomes possible, where a large number of traces appears, as would ordinarily be the case, to readily distinguish one trace from the other.

In the above examples, we have assumed that the ultrasonic beams remain trained in a particular direction. In practice, standard scanning techniques may be used, as in the case of sonar systems.

Displays in pulse echo scanning are classified by scan patterns. The tri-color tube operation may readily be coordinated to the type of scanning used, and where, for example, a plan-position-indication (PPI) or maplike representation is to be produced by scanning in polar coordinates, the deflection yoke may be rotated in synchronism with the ultrasonic scanning assembly. This is shown in FIG. 4, wherein the reflector and the transducer therein are mechanically caused to scan by means of any conventional scanning mechanism, and the deflection yoke 18 is scanned concurrently. Obviously, where other patterns, such as B or C scans are used, the nature of the scanning action is modified accordingly pursuant to conventional practice for such presentations.

In B-scan, the display is produced by modulating cathode beam intensity with the echo amplitude, the displacement of the beam corresponding to the distance of the object which is scanned, in the direction of signal transmission. The presentation is thus a cross-section of the scanned object in the direction of signal transmission, and the image consists of outlines of interfaces which can assume a different color according to the nature of the interface. The color would be produced by the relative changes in echo intensity received from the three transducers for each particular echo point.

In C-scan, an intensity modulated image is produced at right angles to the direction of signal propagation. It is a cross-section of the object parallel to the transducer surface and similar to the X-ray cross-section. The transducer is scanned, as with a television image, in a plane. The echo intensity modulates the color kinescope, as for the B-scan. In this form of scan, horizontal or depth information is not present in black and white form. But color, due to the differential transmissivity of the sound at different frequencies, can be made to provide a depth indication as well as being indicative of the nature of the reflecting surface.

While there have been shown what are considered to be preferred techniques in accordance with the invention, it will be appreciated that many changes may be made therein without departing from the spirit thereof as set forth in the appended claims.

What is claimed is:

1. The method of examining the internal structure of a body, comprising the steps of irradiating the body with three beams of ultrasonic energy projected in the same direction but having different frequencies, separately detecting said beams after they are intercepted by structural components of said body to produce signals whose respective amplitudes are indicative of the characteristics of said structural components of said body with respect to the beam frequencies, generating in response to each signal a primary color pattern whose intensity depends on the amplitude of said signal, and additively coordinating said primary color patterns to produce a color pattern representative of the characteristics of said structural components.

2. The method of examining the internal structure of a living organism, comprising the steps of simultaneously irradiating a particular region of the organism with three beams of ultrasonic energy in pulse form projected in the same direction but having different carrier frequencies, detecting and receiving echo pulses from said region with respect to each transmitted beam to produce three trains of echo pulses, modulating the intensity of three separate cathode ray beams in a color television system with said three trains of echo pulses to produce three different primary color images each representative of a respective train, and coordinating the three primary color images to produce an additive color pattern representative of the irradiated region.

3. The method as set forth in claim 2, wherein said ultrasonic beams are caused to scan said region and said beams are concurrently scanned to produce a B-type presentation.

4. The method as set forth in claim 2, wherein said ultrasonic beams are caused to scan said region and said beams are concurrently scanned to produce a C-type presentation.

5. Apparatus for the ultrasonic detection of internal structure and the visualization thereof in color, comprising means to irradiate said internal structure with three beams of ultrasonic energy projected in the same direction, each beam having a different frequency, means separately to detect said beams after they are intercepted by said internal structure to produce signals whose amplitudes are indicative of the characteristics of components of said structure with respect to said frequencies, and a color television system to translate said signals into three primary color patterns whose intensities depend on the amplitudes of said signals, and to additively coordinate said patterns to produce a color pattern representative of the characteristics of said structural components.

6. Apparatus for the ultrasonic detection of internal structure and the visualization thereof in color, comprising means to irradiate said internal structure with three beams of ultrasonic energy projected in the same direction, each beam having a different frequency, means separately to detect said beams to produce signals whose amplitudes are indicative of the characteristics of components of said structure intercepted by said beams with respect to said frequencies, a tri-color indicator including a cathode ray tube having three primary-color electron beam guns and means to converge the beams from said guns onto a color screen, and means to apply said signals to said guns to vary the intensity of said beams.

7. The method of examining the internal structure of a body, comprising the steps of transmitting through the body three beams of ultrasonic energy projected in the same path but having different frequencies, separately detecting said beams to produce signals whose time position relative to the transmitted beams is indicative of the spatial position of internal targets in the path of said beams and whose respective amplitudes are indicative of the structural characteristics of said targets with respect to the beam frequencies, generating in response to each signal a distinct primary color pattern whose intensity depends on the amplitude of said signal, and additively coordinating said distinct color patterns to produce a resultant color pattern representative of said structure.

8. The method as set forth in claim 7, wherein said beams are generated by three transducers operating concurrently at different carrier frequencies.

9. The method as set forth in claim 7, wherein said beams are generated by a common transducer operating sequentially at harmonically related frequencies.

10. Apparatus for examining the internal structure of a body, comprising transducer means to transmit through said body three beams of ultrasonic energy projected in the same path having different frequencies, receiver means tuned to detect each of said beams to produce echo signals whose time position relative to the transmitted beams is indicative of the spatial position of internal targets in the path of said beams with respect to said transducer means and whose respective amplitudes are indicative of the structural characteristics of said targets with respect to the beam frequencies, and a cathode ray tri-color kinescope responsive to said signals to produce a pattern on a screen wherein the targets have colors resulting from the relative values of said signal amplitudes and are spatially arranged on said screen in accordance with the time position of said signals with respect to said transducer means.

References Cited in the file of this patent

UNITED STATES PATENTS

| 3,023,611 | Howry | Mar. 6, 1962 |
| 3,036,151 | Mitchell et al. | May 22, 1962 |

OTHER REFERENCES

Donald et al.: article in British periodical, the Lancet, June 7, 1958 issue, pages 1188–1195.